US009922130B2

(12) United States Patent
Burne et al.

(10) Patent No.: US 9,922,130 B2
(45) Date of Patent: Mar. 20, 2018

(54) MIGRATING DATA FOR WEB CONTENT MANAGEMENT SYSTEMS

(71) Applicant: OSHYN, Inc., Long Beach, CA (US)

(72) Inventors: Christian Burne, Los Alamitos, CA (US); Prasanth Nittala, Culver City, CA (US)

(73) Assignee: OSHYN, Inc., Long Beach, CA (US)

( * ) Notice: Subject to any disclaimer, the term of this patent is extended or adjusted under 35 U.S.C. 154(b) by 787 days.

(21) Appl. No.: 14/454,676

(22) Filed: Aug. 7, 2014

(65) Prior Publication Data
US 2015/0134681 A1    May 14, 2015

Related U.S. Application Data

(60) Provisional application No. 61/863,886, filed on Aug. 8, 2013.

(51) Int. Cl.
G06F 17/30    (2006.01)
G06F 17/24    (2006.01)

(52) U.S. Cl.
CPC ...... *G06F 17/30893* (2013.01); *G06F 17/248* (2013.01); *G06F 17/3089* (2013.01)

(58) Field of Classification Search
CPC ............ G06F 17/3089; G06F 11/0709; G06F 17/248; G06F 17/30386; G06F 17/30893; H04N 21/6125
See application file for complete search history.

(56) References Cited

U.S. PATENT DOCUMENTS

| | | | |
|---|---|---|---|
| 6,356,903 B1 * | 3/2002 | Baxter | G06F 17/2229 707/702 |
| 7,039,594 B1 * | 5/2006 | Gersting | G06Q 10/06 705/14.73 |
| 7,072,934 B2 * | 7/2006 | Helgeson | G06F 9/468 709/203 |
| 7,222,121 B2 * | 5/2007 | Casati | H04L 67/22 |
| 7,676,486 B1 | 3/2010 | Tulkoff et al. | |
| 7,774,300 B2 | 8/2010 | Hsiao et al. | |
| 7,882,110 B2 | 2/2011 | Bahr | |
| 8,095,873 B2 | 1/2012 | Kipp et al. | |

(Continued)

OTHER PUBLICATIONS

"Falcon Software", http://www.falcon-software.com/Portfolio/Featured-Case-Study-CMS-Migration.
(Continued)

*Primary Examiner* — Kris Mackes
*Assistant Examiner* — Merilyn Nguyen
(74) *Attorney, Agent, or Firm* — Tsircou Law, P.C.

(57) ABSTRACT

A computer-based system and related method are provided for migrating data associated with a website from a first Web content management (WCM) platform to a second WCM platform. The data migrated can include templates, user and group data files, content files (media, texts and others), workflows, authorizations, among others. The system and related method can further include a transformation capability that enables modifications to website data elements during migration, including but not limited to templates, HTML, users, metadata, file assets, and content such as images, links, and text during migration. In this manner, web administrators can modify the website design during migration to a new WCM platform within an integrated process.

12 Claims, 16 Drawing Sheets

(56) References Cited

U.S. PATENT DOCUMENTS

| | | | |
|---|---|---|---|
| 8,473,458 B2 | 6/2013 | Yambal et al. | |
| 8,904,368 B2* | 12/2014 | Haenel | G06F 8/61 717/147 |
| 8,978,029 B2* | 3/2015 | Schwaninger | G06F 8/61 717/174 |
| 9,182,963 B2* | 11/2015 | Mallya | G06F 8/60 |
| 9,635,395 B2* | 4/2017 | Perez | H04N 21/239 |
| 2002/0049788 A1 | 4/2002 | Lipkin et al. | |
| 2003/0014483 A1* | 1/2003 | Stevenson | H04L 29/06 709/203 |
| 2005/0086262 A1* | 4/2005 | Kiiskinen | G06F 17/3089 |
| 2005/0149536 A1 | 7/2005 | Wildes et al. | |
| 2007/0106710 A1 | 5/2007 | Haustein et al. | |
| 2008/0295092 A1 | 11/2008 | Tan et al. | |
| 2009/0019386 A1* | 1/2009 | Sweetland | G06F 17/248 715/765 |
| 2010/0070448 A1 | 3/2010 | Omoigui | |
| 2010/0077320 A1 | 3/2010 | Lepore et al. | |
| 2011/0231784 A1 | 9/2011 | Meng et al. | |
| 2011/0239231 A1 | 9/2011 | Brown et al. | |
| 2011/0289054 A1 | 11/2011 | Johnson | |
| 2013/0007051 A1 | 1/2013 | Astle et al. | |
| 2013/0144911 A1 | 6/2013 | Watanabe | |

OTHER PUBLICATIONS

"Drupal Migration Service", http://usdrupalforce.com/drupal-migration-service.php.

Robertson, James, "Content Migration: Options and Strategies", Step Two, http://www.steptwo.com.au/papters/kmc_migration/, Jul. 21, 2008.

Gorzela, Richard, "Migration to IBM Web Content Manager V7: A Case Study", http://public.dhe.ibm.com/software/dw/lotus/MigrationToWCMFinal.pdf, Apr. 2011.

James, John, "Web Content Management 6.0 Migration Planning and Best Practices", https://www-10.lotus.com/ldd/portalwiki.nsf/dx/07142008113807pmweb6af.htm, Sep 13, 2012.

* cited by examiner

MIGRATING DATA FOR WEB CONTENT MANAGEMENT SYSTEMS

CROSS REFERENCE TO RELATED APPLICATION

This application claims the benefit of U.S. Provisional App. No. 61/863,886, filed Aug. 8, 2013, which is incorporated by reference.

FIELD OF THE INVENTION

The present invention relates generally to data migration systems and, more particularly, a system and related method for migrating data between web content management systems.

BACKGROUND OF THE INVENTION

Web content management (WCM) systems are used to create, manage, and control collections of web-based material, e.g., Hypertext Markup Language (HTML) documents, PHP documents, images, and others. A WCM system generally facilitates document control, editing, timeline management, and publication of a website. For instance, a typical WCM system can provide one or more of the following features: automated templates, easily editable content, workflow management, document management, and content virtualization, among others. Using a WCM system provides developers with tools that allow for the creation of attractive and well-designed web pages and/or websites with uniform or related layouts.

Modern websites often use web content management (WCM) systems. WCM systems allow website administrators to control the content of their web pages, among other features. For instance, WCM systems allow users to add or edit information on a web page without requiring programming knowledge and to manage content workflows and user permissions.

With the growing complexity of website design, content management has evolved from merely managing the storage and access of document data on local computers to controlling increasingly complex data such as HTML codes, modules, permissions, and the linking of sub-pages and hosted images to a web site, with near real-time updates.

Many web content management (WCM) systems exist in the marketplace, such as Sitecore® (of Sitecore Corporation), Drupal™ (open source), Adobe CQ® (of Adobe Systems Incorporated), HP Autonomy TeamSite™ (of HP Autonomy), Oracle Fatwire (of Oracle Corporation), Microsoft SharePoint (of Microsoft Corporation), EPiServer® (of EPiServer Inc.), OpenText® web site management (of OpenText Corp.), Ektron® WCM (of Ektron, Inc.), among others. Each of the systems has unique features and functionalities. As general matter, each of these systems has an internal working environment that enables web administrators to control and manipulate website content prior to publishing the site on the web. Moreover, within its internal working environment, each WCM system has unique terminology and linking methodologies. This enables these systems to provide ease of use for within their respective environments, but make transportability of websites between systems problematic.

The state of the art in website design and WCM systems advances quickly. As such, site administrators periodically elect to move their websites to new WCM systems to keep pace with the rapidly increasing sophistication of web-based systems. In addition, as a company grows, its requirements for a WCM system change. With a small company, a basic WCM system might be satisfactory. However, as companies grow, they frequently have the need to use increasingly complex WCM systems. Thus, companies will find the need to migrate between WCM systems.

However, migration can be a difficult problem. Current approaches for migrating content can be labor-intensive and highly vulnerable to error. As a result, some companies are forced to write individualized code to automate part of the data migration process, but this is highly technical and time-consuming. As a result, most data migration projects either fail or go over budget.

Off-the-shelf systems for data migration exist and can be generally effective from transferring data files, however, shortfalls exist. For example, such systems typically migrate the published website files. As a result, the functionality that existed within the internal working environment of the first WCM system is lost, such as internal linking, templates, WCM-specific terminology, and other features, which the web administrator often must manually correct within the new WCM environment. Moreover, current approaches can be slow—it can take several days to transfer between WCM systems, resulting in times when the website is unavailable.

It should, therefore, be appreciated that there exists a need for a data migration system that rapidly transfers all the data needed.

SUMMARY OF THE INVENTION

It is an object of the present invention to provide a system that moves data, including page templates, modules, and other content, across WCM systems and re-links pages, modules, and images, making the new site operate like the old site automatically.

Briefly, and in general terms, the invention provides a system and related method for migrating data associated with a website from a first Web content management (WCM) platform to a second WCM platform. The data migrated can include templates, user and group data files, content files (media, texts and others), workflows, authorizations, among others. The system and related method can further include a transformation capability that enables modifications to website data elements during migration, including but not limited to templates, HTML, users, metadata, file assets, and content such as images, links, and text during migration. In this manner, web administrators can modify the website design during migration to a new WCM platform within an integrated process.

In a detailed aspect of an exemplary embodiment, the system provides an extensible application-programming interface (API) that allows programming support for new web sources or target platforms. The user can create custom transformations that modify elements of the migrated files as they are moved between the WCM systems. Back-end running processes and UI enable the user to set up the transformation process then periodically check the progress. The system architecture re-links pages, modules, and images so that the transformed site in the new WCM environment connects items in a similar manner as the old WCM environment.

In another detailed aspect of an exemplary embodiment, the system includes a library of WCM connectors. The connectors integrate WCM systems, using executable code to translate data from the format of the WCM environment to and from a standardized form used by the migration engine.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 7 is an exemplary dashboard interface for the system of FIG. 1, depicting an interface for selecting templates from the source WCM system for migration to the target WCM system.

FIG. 8 is an exemplary dashboard interface for the system of FIG. 1, depicting an event console that displays the status of the migration while the processes is running.

DETAILED DESCRIPTION OF EXEMPLARY EMBODIMENTS

Embodiments described herein are directed to a computer-based system and method for efficiently migrating any or all data associated with a website from a first WCM platform to a second WCM platform. The data migrated can include templates, user and group data files, content files (media, texts and others), workflows, authorizations, among others.

The system further includes a transformation capability that enables modifications to website data elements during migration. The website administrator can transform CMS constructs including but not limited to templates, HTML, users, metadata, file assets, and content such as images, links, and text during migration. In this manner, web administrators can modify the website design during migration to a new WCM platform within an integrated process. In the exemplary embodiment, the system resides in a centralized server and accesses multiple servers in the local network or in the cloud.

Figure 1A:
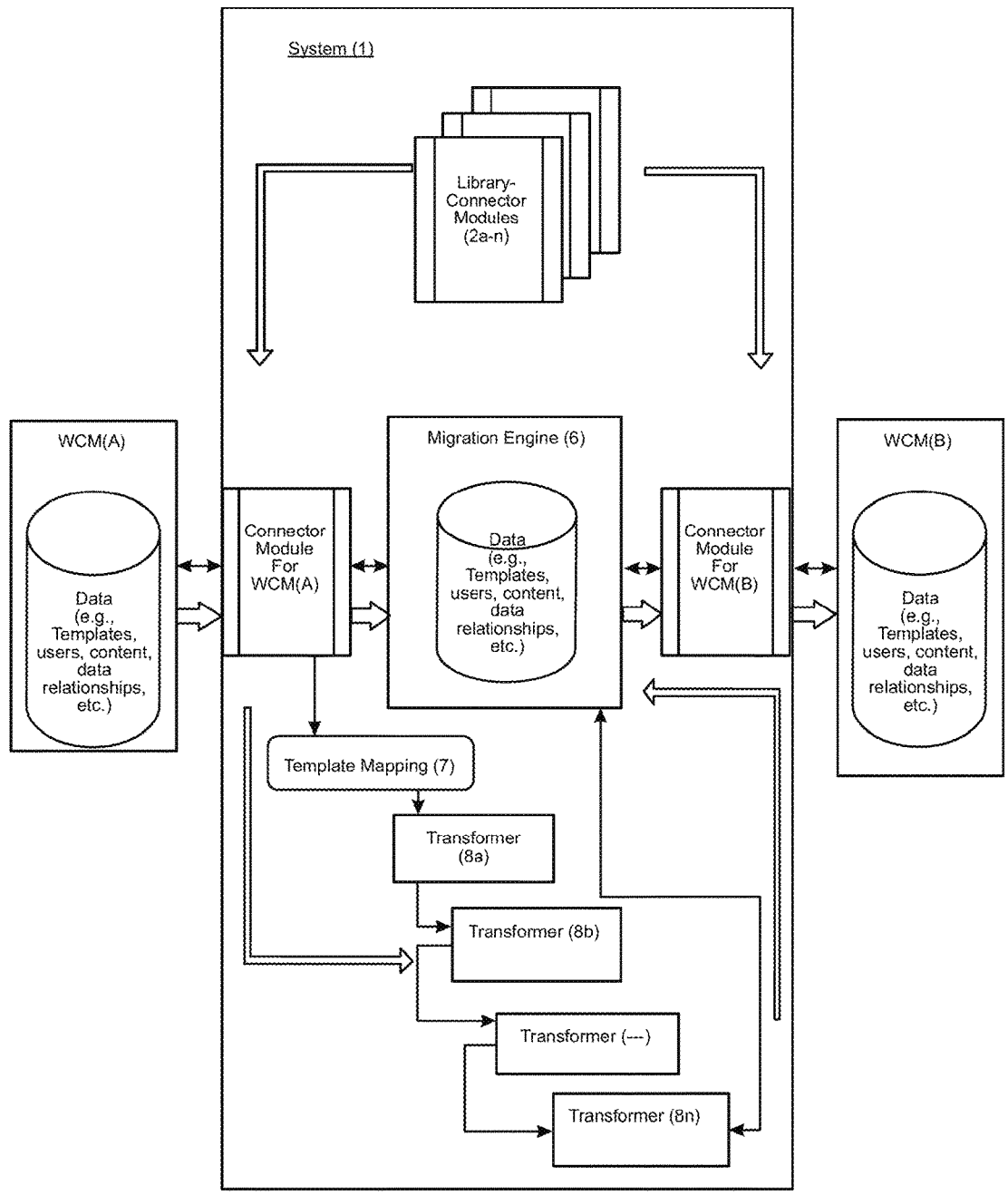
FIG. 1A is a simplified block diagram of a system for migrating data for WCM systems in accordance with the present invention.
Figure 1B:
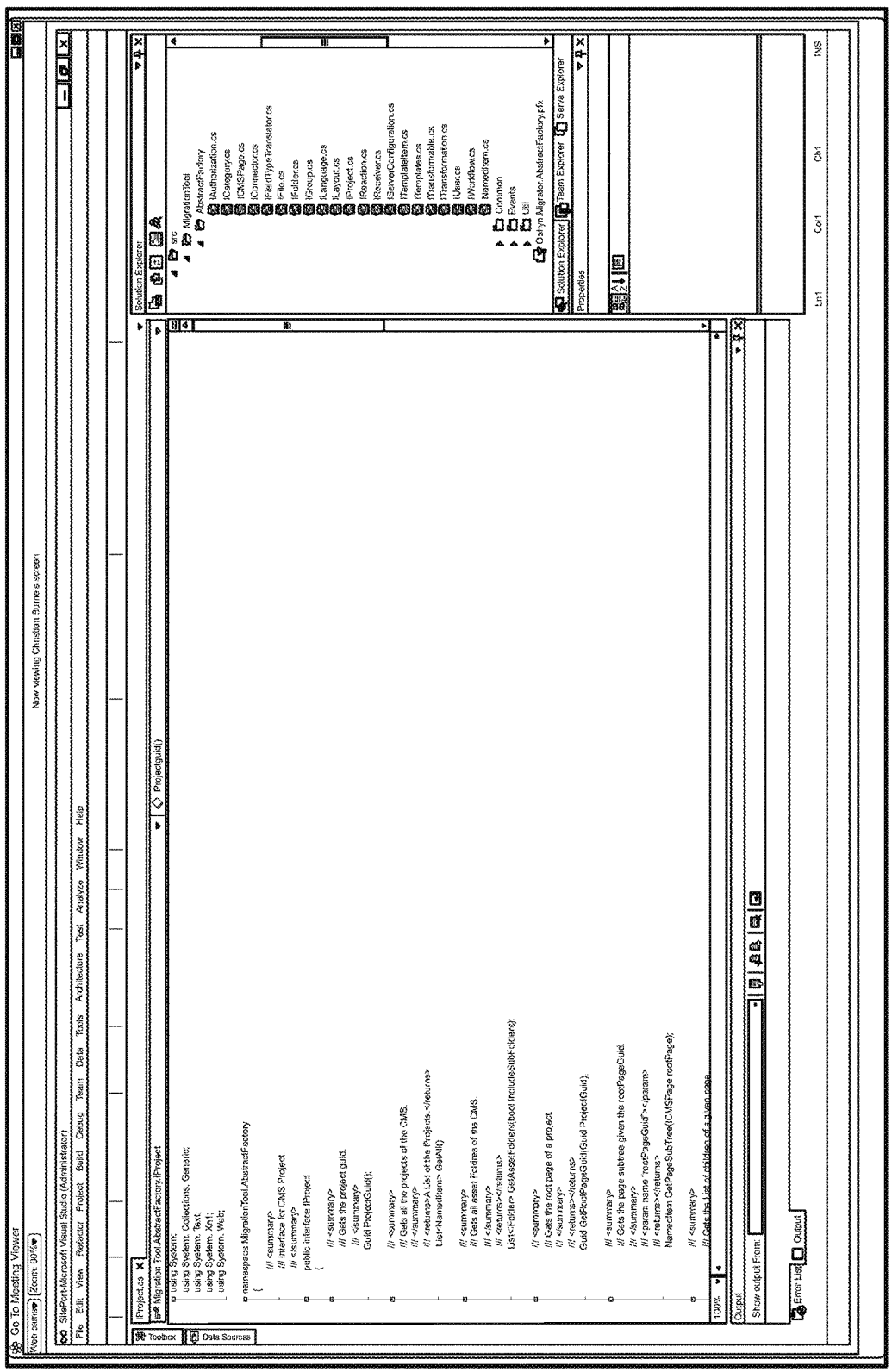
FIG. 1B is a screenshot of a portion of executable code of a connector for the system of FIG. 1

With reference now to FIG. 1A-B, the system 1 includes a migration engine 6 and a library of WCM connectors, e.g., 4(*a, b*), that provide API-level integration with WCM systems. The connectors comprise executable code that translates data formatted to comply with the internal working environment of the particular WCM system to a standardized format used by the migration engine 6 (see, e.g., FIG. 1B).

The system 1 is able to migrate not only content items, but also other data items typically critical to a complete WCM including, for example, the following:

Templates of the selected project or website;
Pages—Content on website pages;
Linkages—Navigation from page to page;
Page Components—Scripts controlling interaction with the server;
Media—Images, videos, charts, and so on;
Users—Users of the selected server;
Groups—User groups of the selected server;
Templates of the selected project;
Metadata of the selected project;
Workflows of the selected project; and
Authorization Packages of the selected project.

The system 1 connects the source WCM system to the templates to provide form, style, and content standardization for the publication and presentation webpages of a website. For example, in an e-commerce site, a template for the display of products can ensure the each product is displayed in consistent matter with the appropriate images and text.

The system 1 further includes a template mapper 7 to allow the user to easily map the content from the original WCM A to the target WCM B. This feature is primarily used to seamlessly move content from the original WCM to the target WCM by automatically reconfiguring to the appropriate format. It may also be used to incorporate new design features into the new website.

Figure 2:
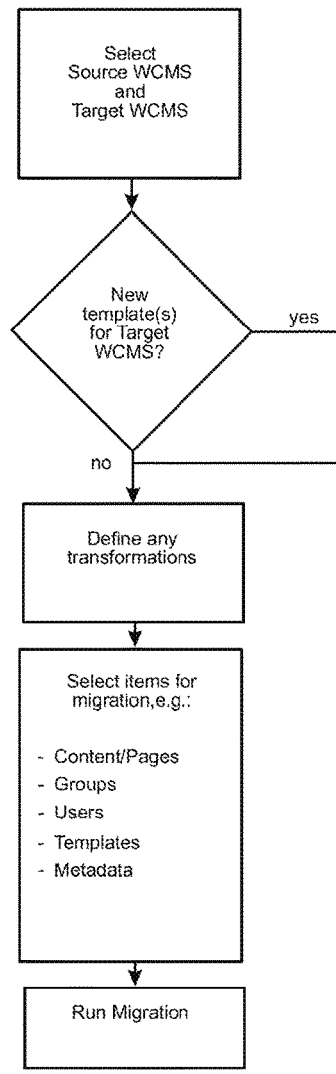
FIG. 2 is a simplified flow chart for the system of FIG. 1, depicting representative steps for initiating a migration from a first WCM system to a second WCM system.
Figure 3:
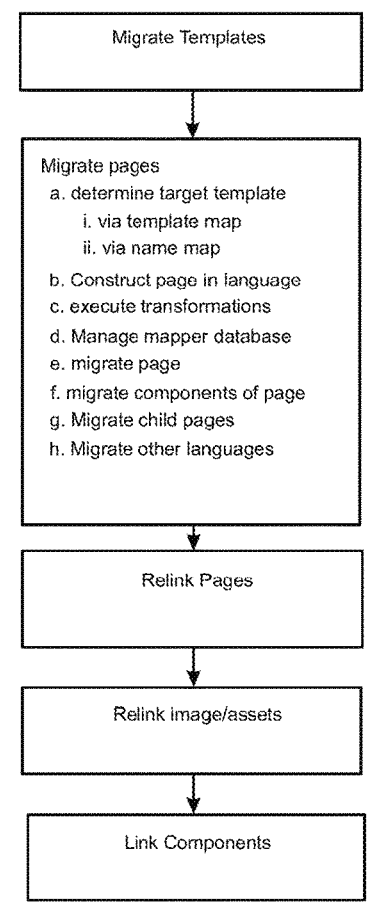
FIG. 3 is a simplified flow chart for the system of FIG. 1, depicting representative steps for migration order of website data.
Figure 4:
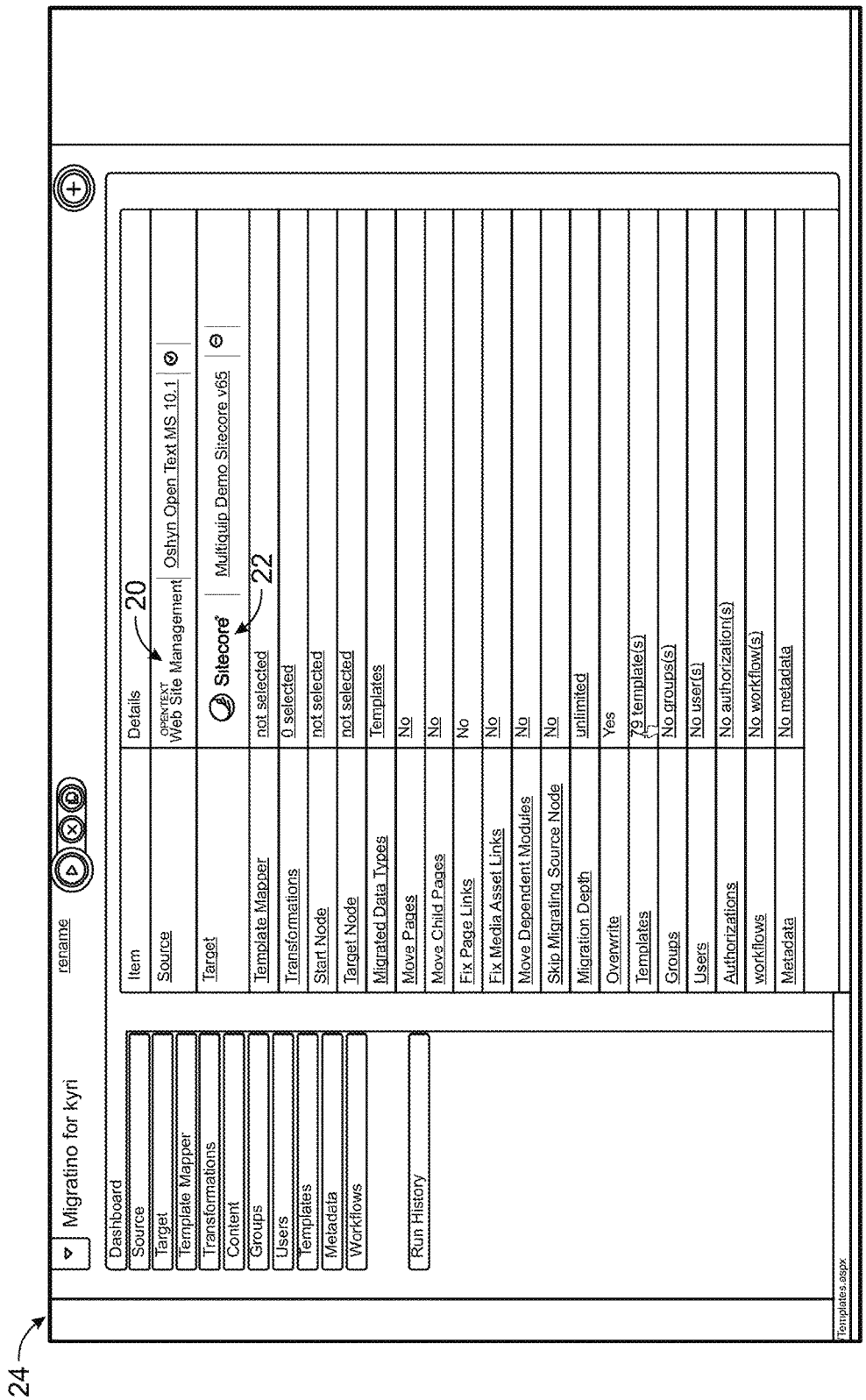
FIGS. 4-6 are exemplary dashboard interfaces for the system of FIG. 1, depicting an interface for connecting with the source WCM and the target WCM systems
Figure 5:
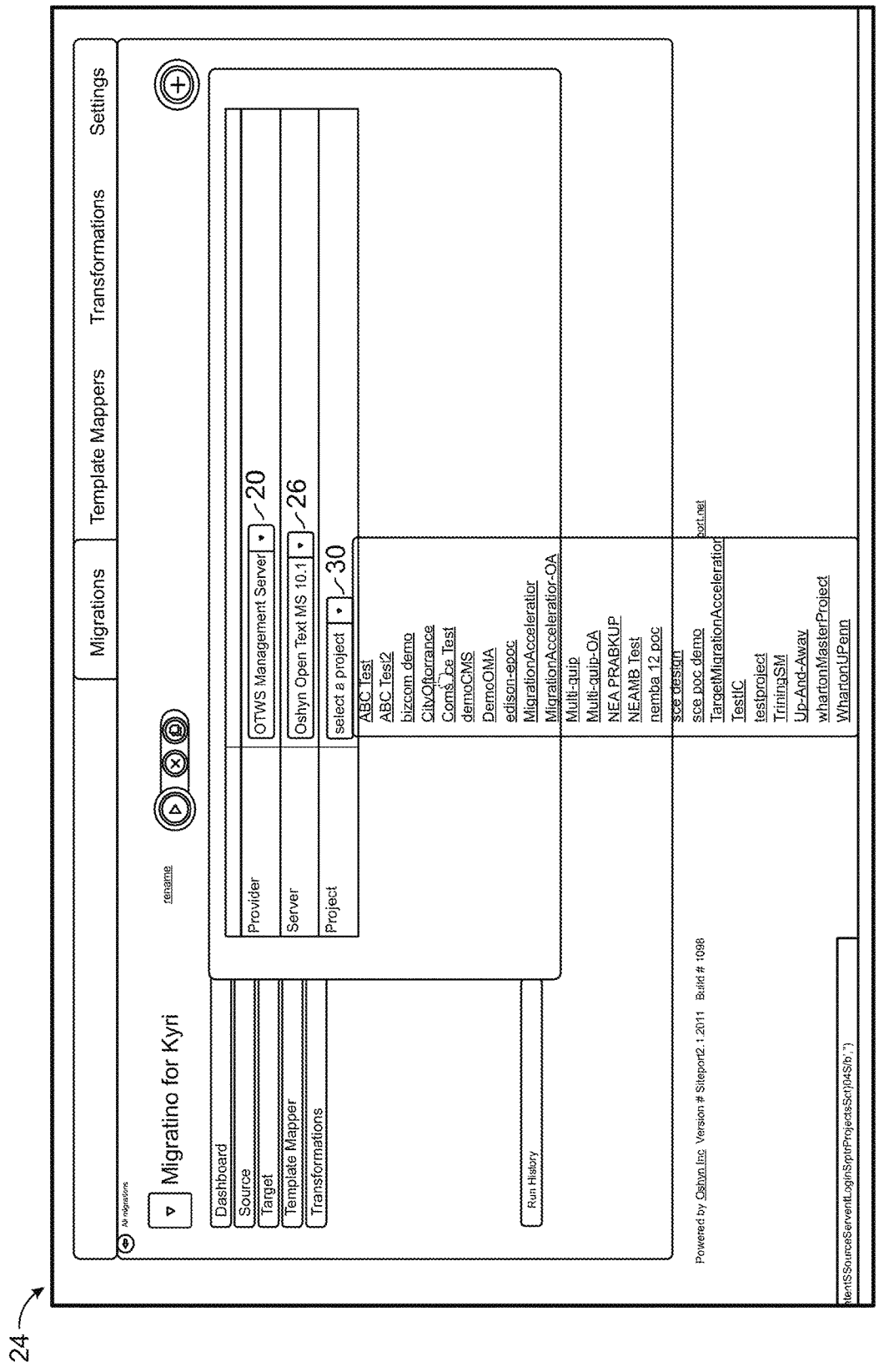
Figure 6:
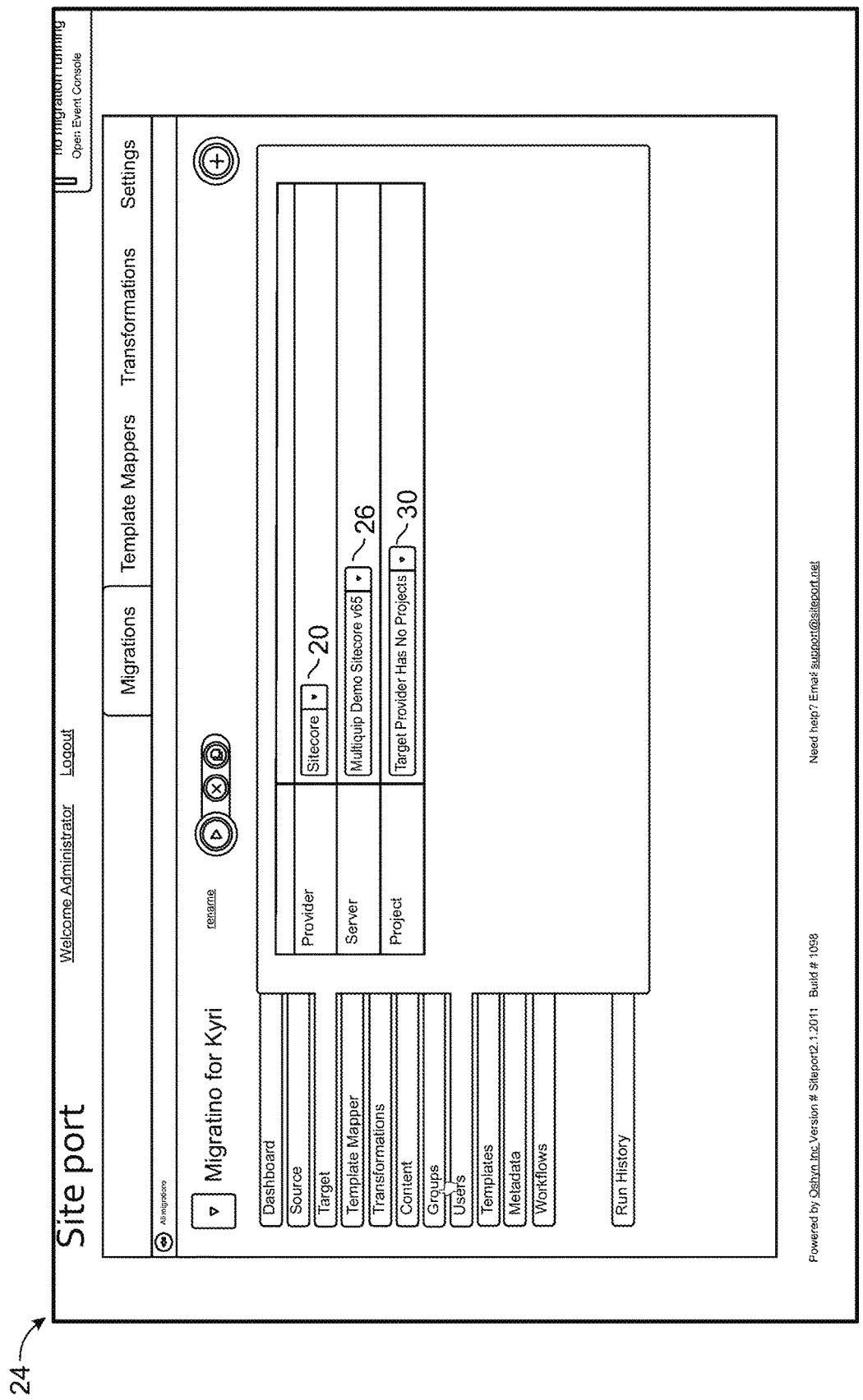

The system further includes the ability to apply customize transformations 8 (*a-n*) to data during the migration process. In this manner, the user can modify the website as it is migrated from the source of WCM system to the target of WCM system. In the exemplary embodiment, the system executes the transformations in serial order (see, e.g., FIGS. 2 and 3).

The system 1 enables users to migrate all or portions of website content between WCM systems. The following presents a few examples of various migrations that can be performed with the system.

Example 1—Template Migration

The system 1 migrate templates from one WCM to another. For example, the system can migrate templates from the Origin WCM system (e.g. OpenText) to the target WCM (e.g. Sitecore). The process can begin with a blank target WCM project. The target WCM content editor interface is empty, which is the default for the target WCM. The site that will be migrated to the target WCM can be viewed in the Origin WCM system.

With reference now to FIGS. 4-8, the source and target WCM systems (20, 22, respectively) are set via the system dashboard 24 for the system to migrate. From the dashboard (24) to set the correct source and target WCM. The dashboard enables the user to select the WCM provider and login to the WCM's server 26 to select the desired project list 30 for migration. The same process is performed for connecting to the target WCM 22, (select the target WCM as the provider and select the server).

Figure 7:
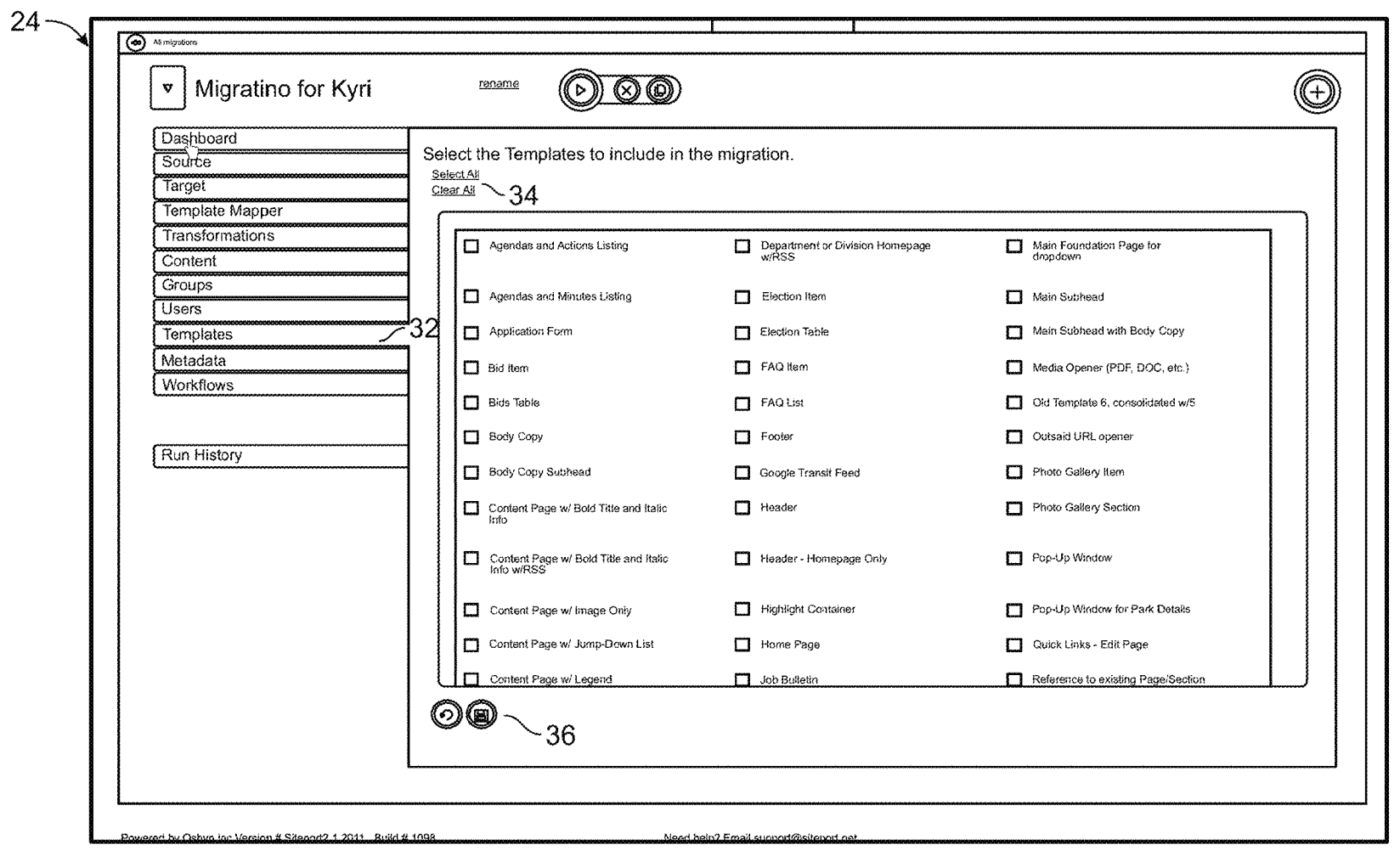

The system populates a list of all the available templates from this source WCM system. The user selects the templates for migration. In the exemplary embodiment, the template icon is located in the left navigation 32. The user can migrate all templates by choosing "select all" option 34 (FIG. 7). The user can initiate the migration by selecting the play icon 42 to run the migration.

Figure 8:
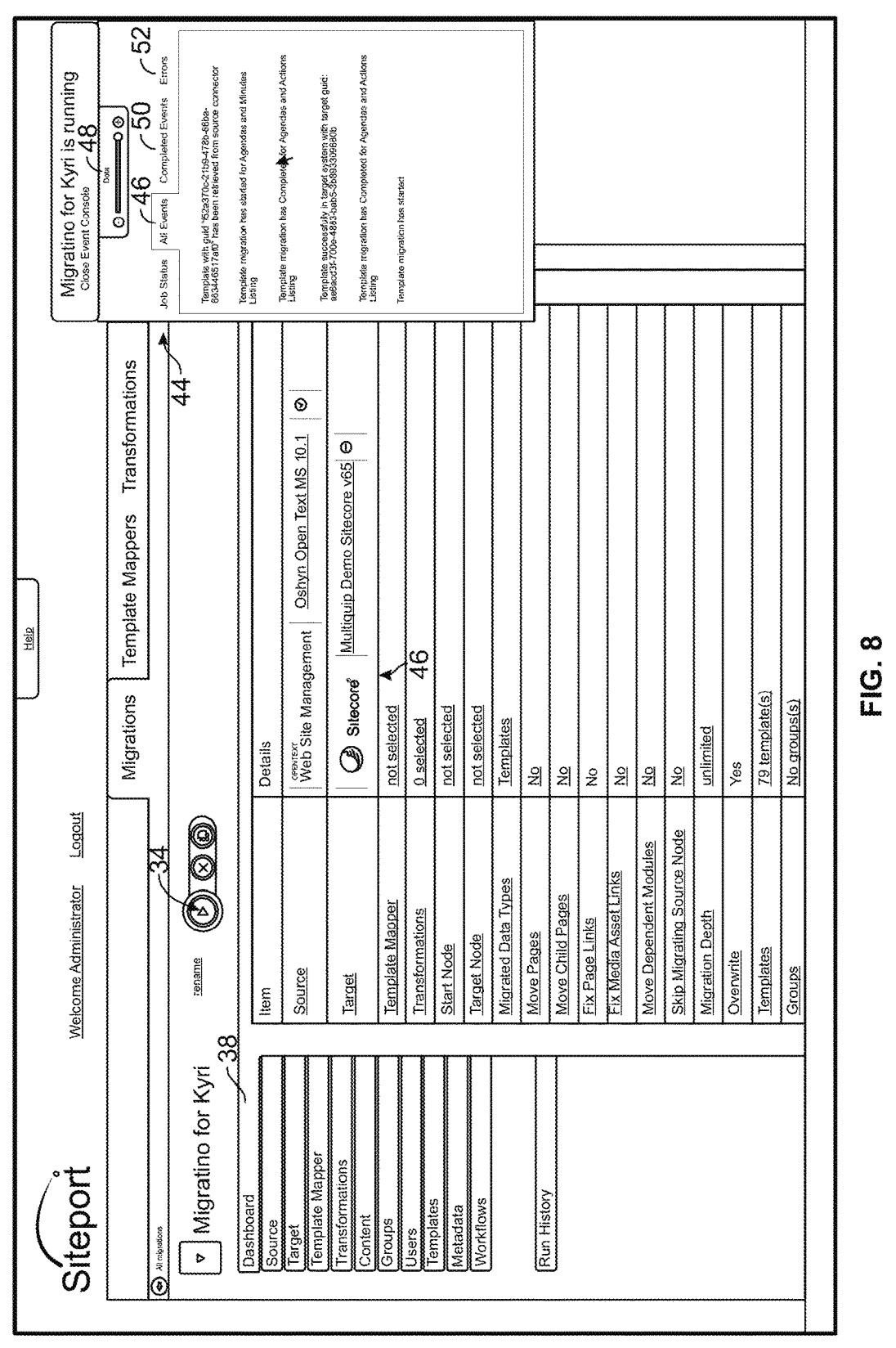

With reference now to FIG. 8, the system provides an event console 44 that shows the status of the migration while the migration is running. The event console enables the user to view the progress of the migration without having to be actively involved in the process. The event console 44 has four clickable tabs that allow the user to see different types of information: "Job Status", "All Events" 46, "Completed Events" 50, and "Errors" 52. By selecting the "All Events" tab 46, the system will display shows all the events in the migration as they occur. The "Details" bar 48 can be used to show more or less information about the events being migrated. The "Completed Events" tab 50 will list the events completed when the migration is complete. The "Errors" tab 52 will list any errors during the migration. The user has the option to close the event console at any time. When the transfer is complete, "Completed" is displayed in green.

The system allows the user to check the migrated templates in the target WCM after migration is complete. The user can check the target WCM project and open the templates, layouts and sub-layouts notes 54 to check that all the templates have been migrated. The system allows you to compare an original template in the Origin WCM system to a newly migrated template in the target WCM. Open the HTML template in the Origin WCM system and the target WCM at the same time to compare them to each other.

Since WCM systems typically use different terminology, the system comes with transformers to ensure that items that are described differently from one WCM to another are migrated correctly. Overall, the system can be used to migrate all templates from one WCM to another.

Example 2—All Content Migration

Figure 9:
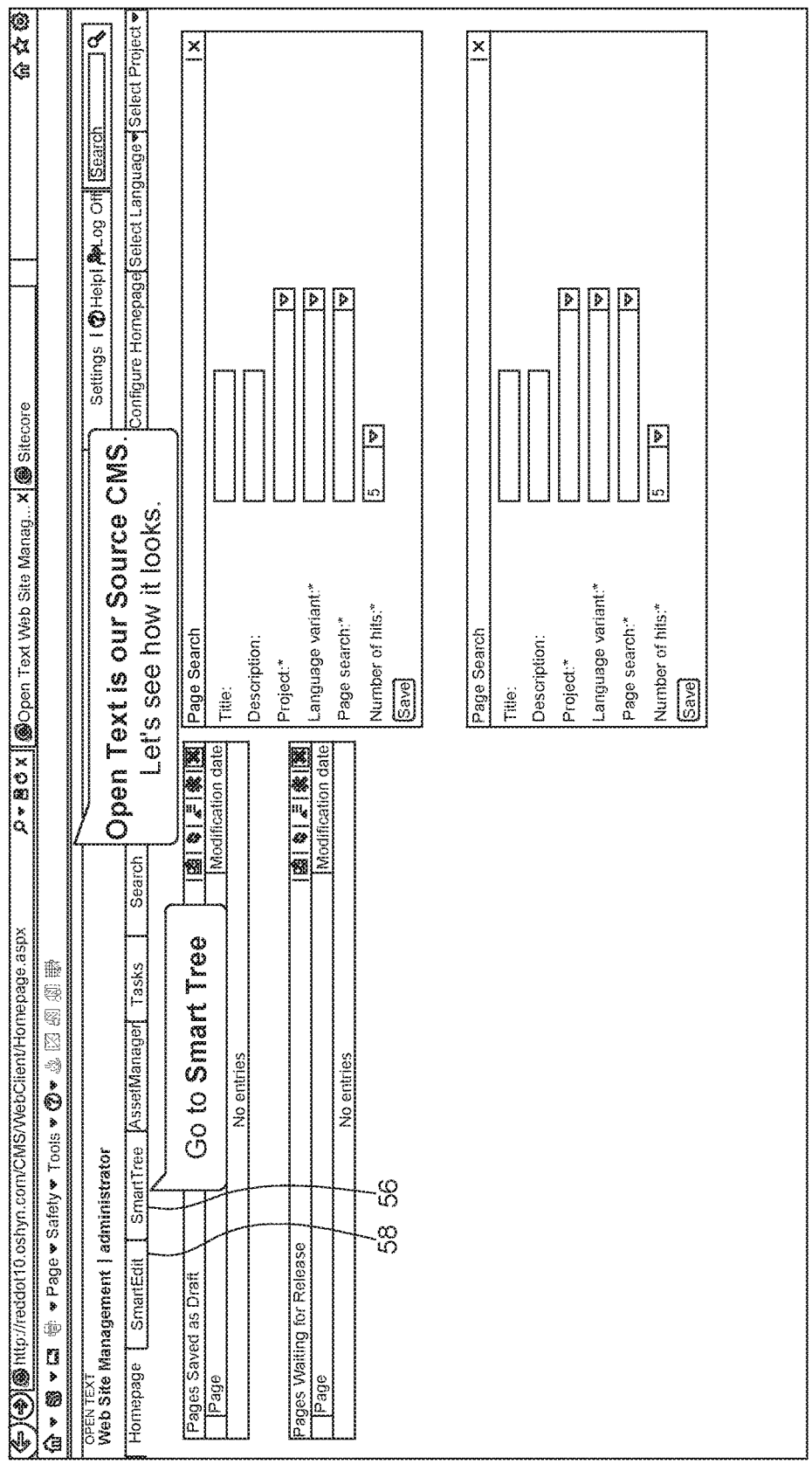
FIG. 9 is an exemplary dashboard interface for the system of FIG. 1, depicting an interface for determining content structure within the source WCM system.
Figure 10:
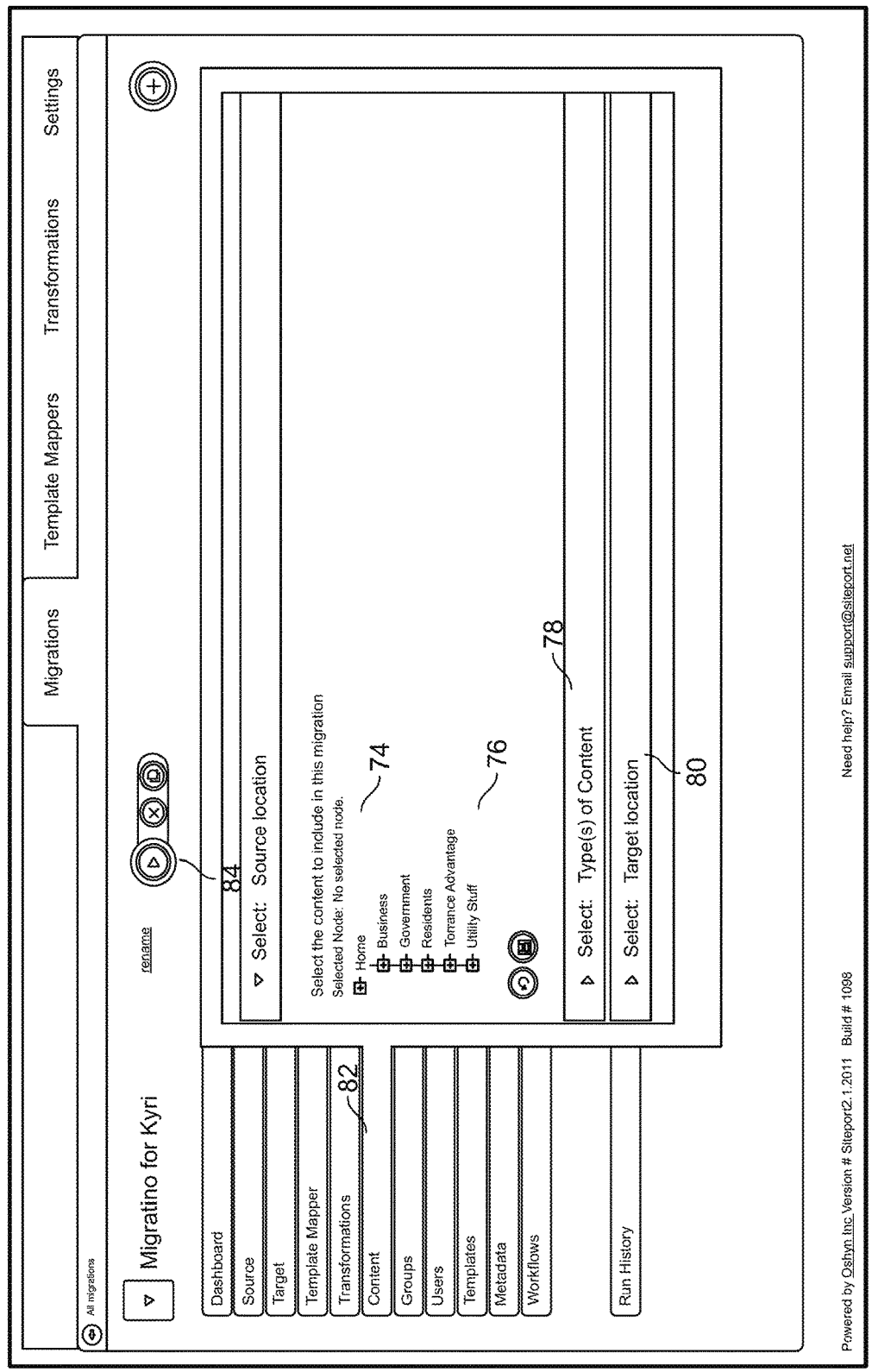
FIG. 10 is an exemplary dashboard interface for the system of FIG. 1, depicting an interface for content migration.
Figure 11:
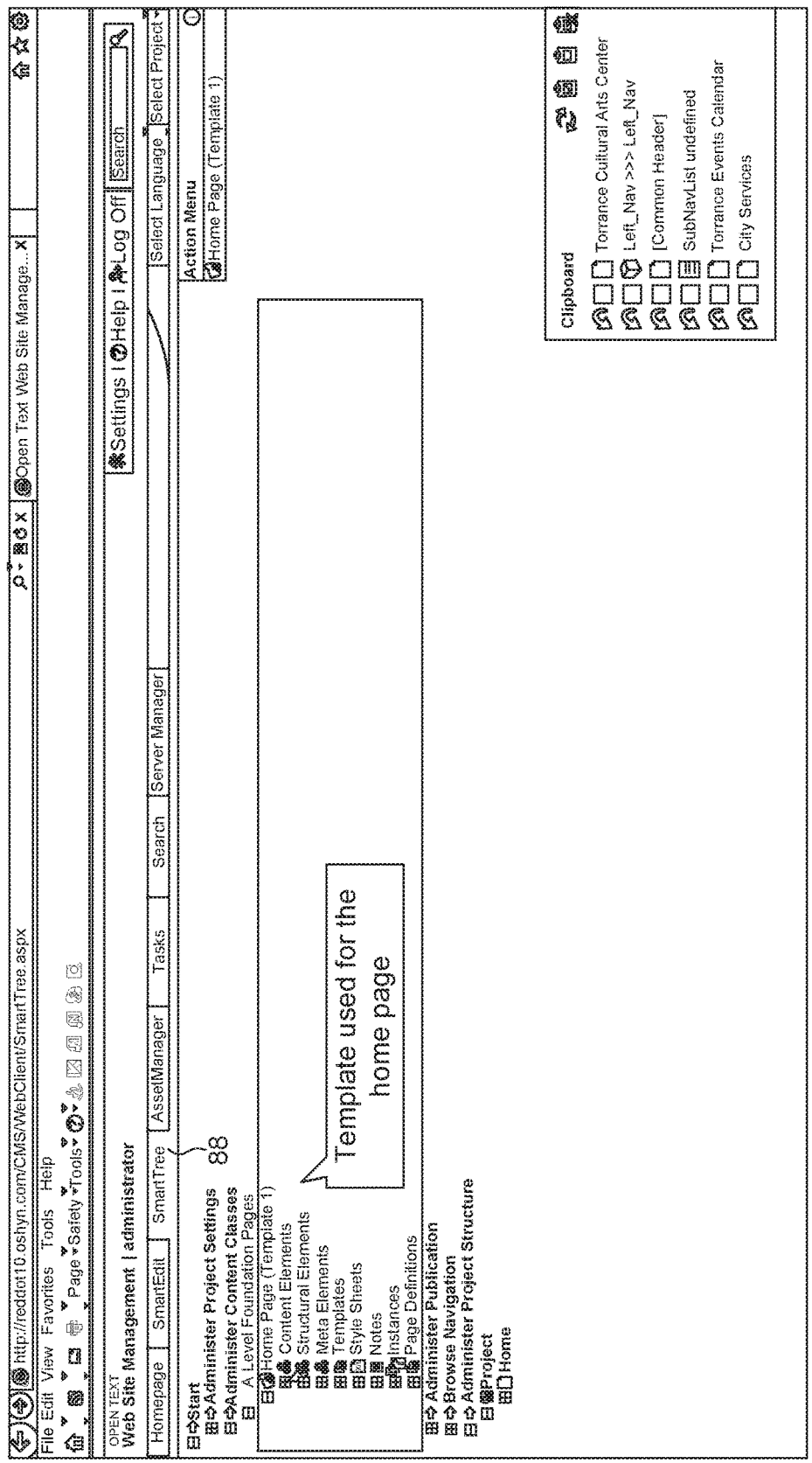
FIG. 11 is an exemplary dashboard interface for the system of FIG. 1, depicting an interface locating a template within an origin WCM system.

With reference now to FIGS. 9-10, the system enables the user to migrate all your content from the Origin WCM system (e.g. OpenText) to the target WCM (e.g. Sitecore). From the Origin WCM system, click on SmartTree 56 to see how the content is structured, by selecting on the "SmartEdit" tab 58 (FIG. 9). The target WCM must also have already acquired the media library prior to content migration. The images 60 can be installed using the target WCM installation wizard.

With reference now to FIG. 10, the system enables the user to select content for migration via an intuitive interface. A content tree 74 for the origin WCM system is depicted, so the user can select one or more nodes 76 to migrate. Then the user selects the type(s) of content to migrate 78. In a full migration, all the boxes should be checked. You can also select the migration depth, indicating how deeply the system will migrate under the node selected, up to an unlimited depth.

The user can initiate migration by selecting the start arrow 84 to begin the migration. As discussed above, an event console will expand to show all the migrations taking place, after the migration begins. The console can be used to view information about each event. The job status tab in the event console will indicate when the migration is complete. Once a migration is completed, the user can review the migrated content.

Example 3—Content Migration and Site Redesign

With reference now to FIGS. 9-16, the system can be used to redesign templates for the website during content migration, by utilizing a template mapper.

Figure 12:
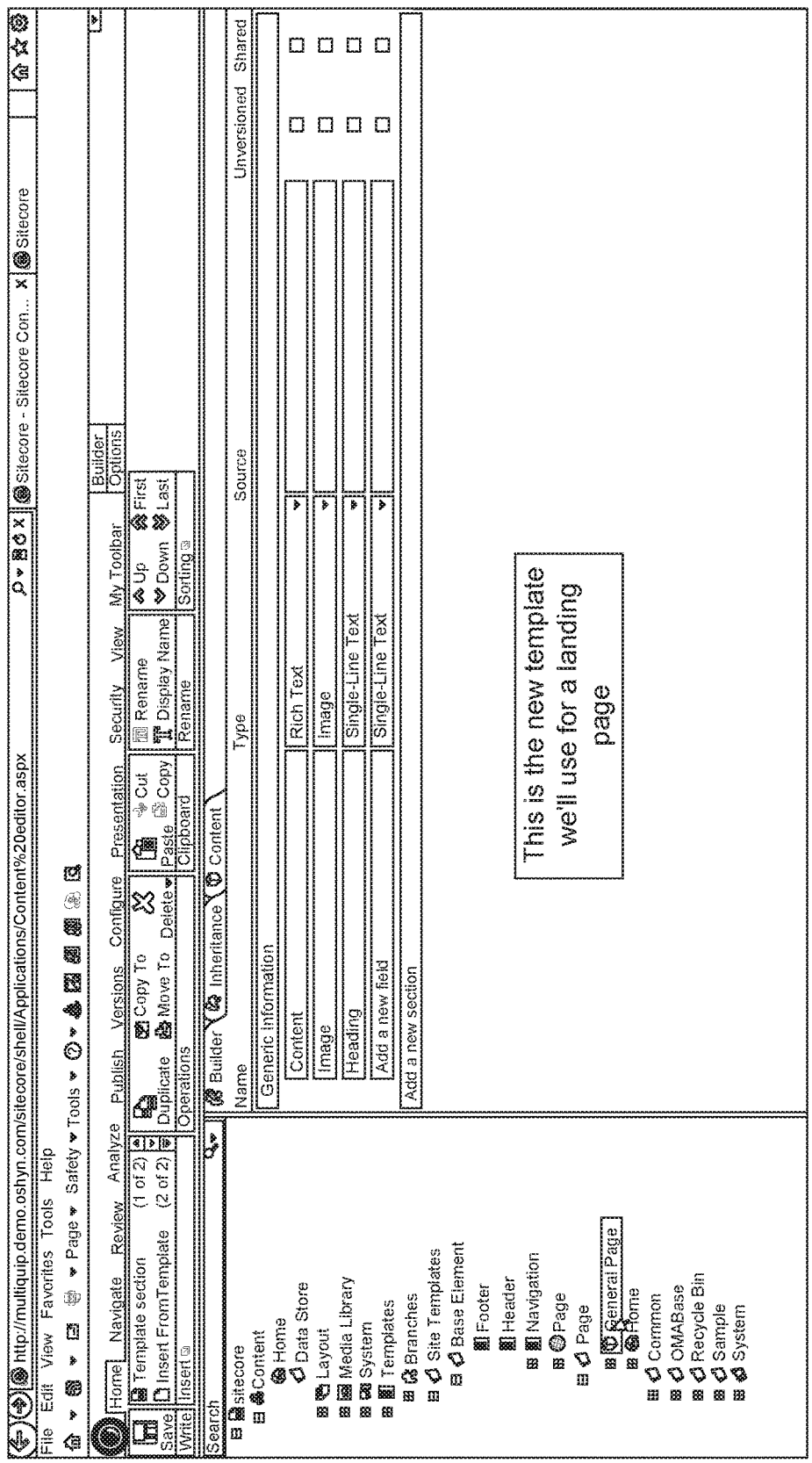
FIG. 12 is an exemplary dashboard interface for the system of FIG. 1, depicting an interface for viewing templates within the target WCM system.

The user can locate the template used for the homepage in the origin WCM system (FIG. 11) and navigate to find a template used for a single page in the site. The system further enables the user to view the template elements of a single page. Next, the use can further view the new templates in the target WCM (FIG. 12). The use can design the target template to incorporate the new design features for the website to be hosted by the target WCM system.

Figure 13:
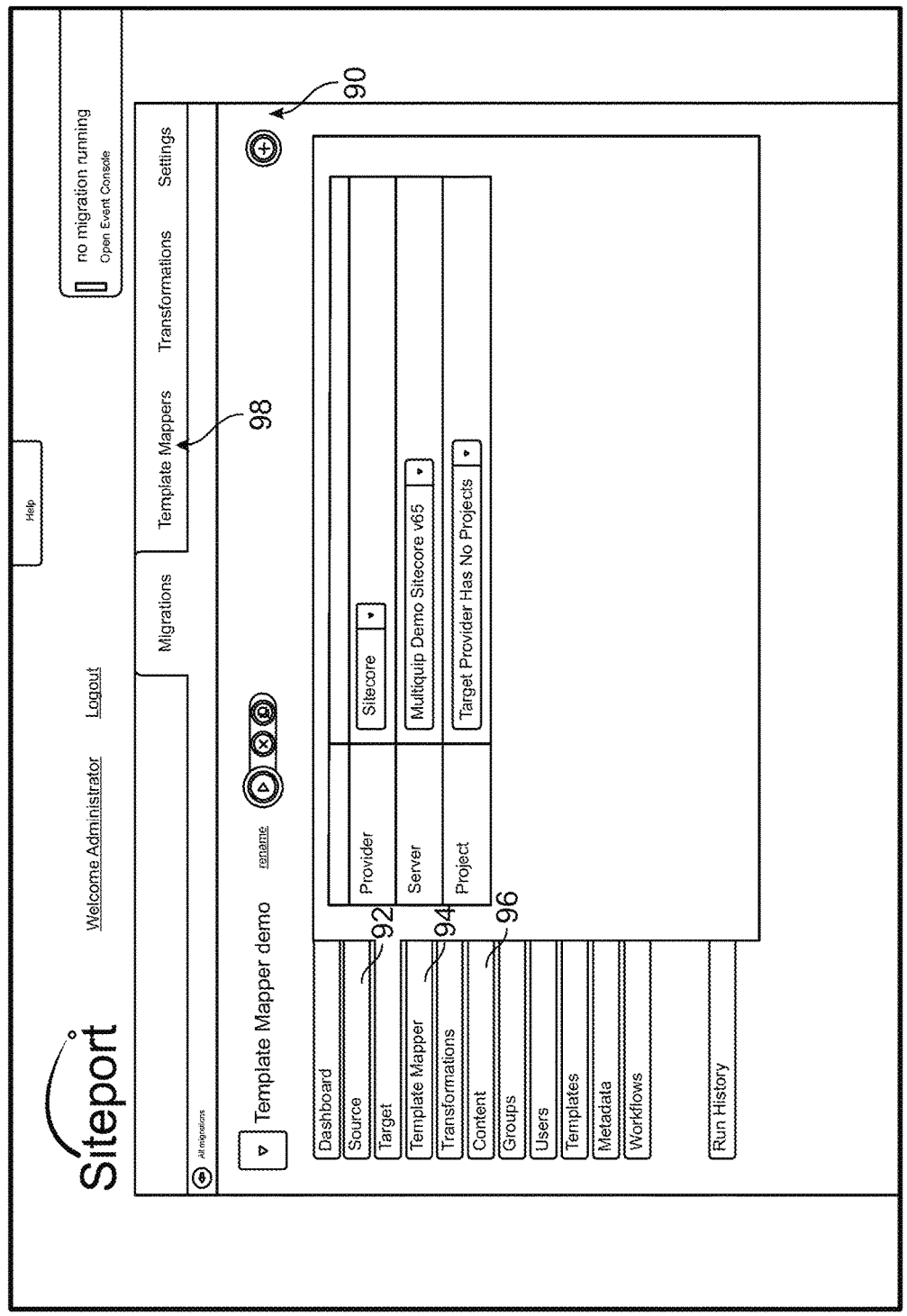
FIG. 13 is an exemplary dashboard interface for the system of FIG. 1, depicting an interface for configuring template mapping.

To begin the migration, the user creates a new configuration 90 and configures the source 92 and target 94 WCM (FIG. 13). As discussed above, the user selects the content 96 to migrate from the source. The user also selects the type of content, the migration depth, selects the target location for the content, and clicks "Save".

Figure 14:
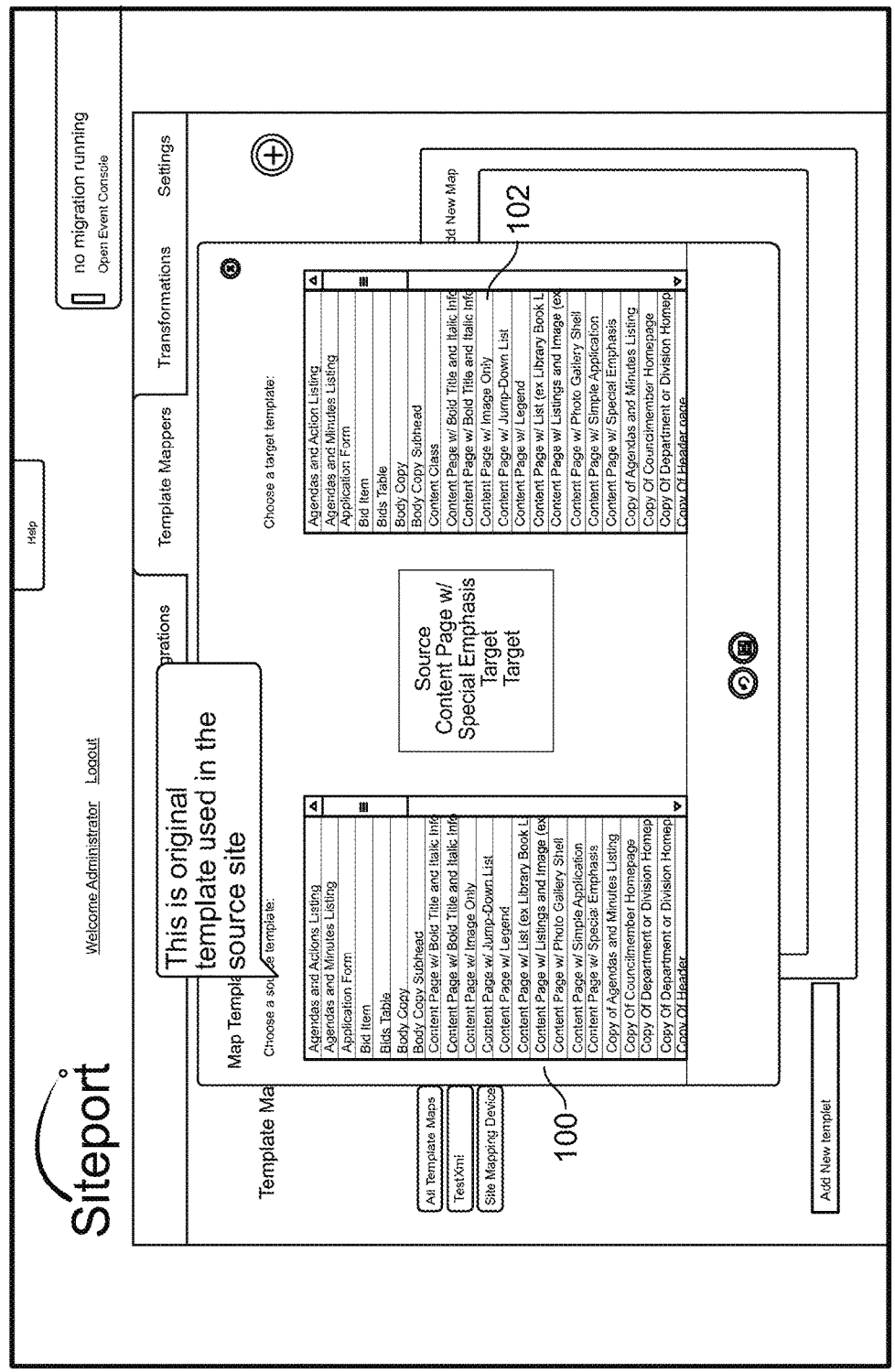
FIG. 14 is an exemplary dashboard interface for the system of FIG. 1, depicting an interface for template mapping.
Figure 15:
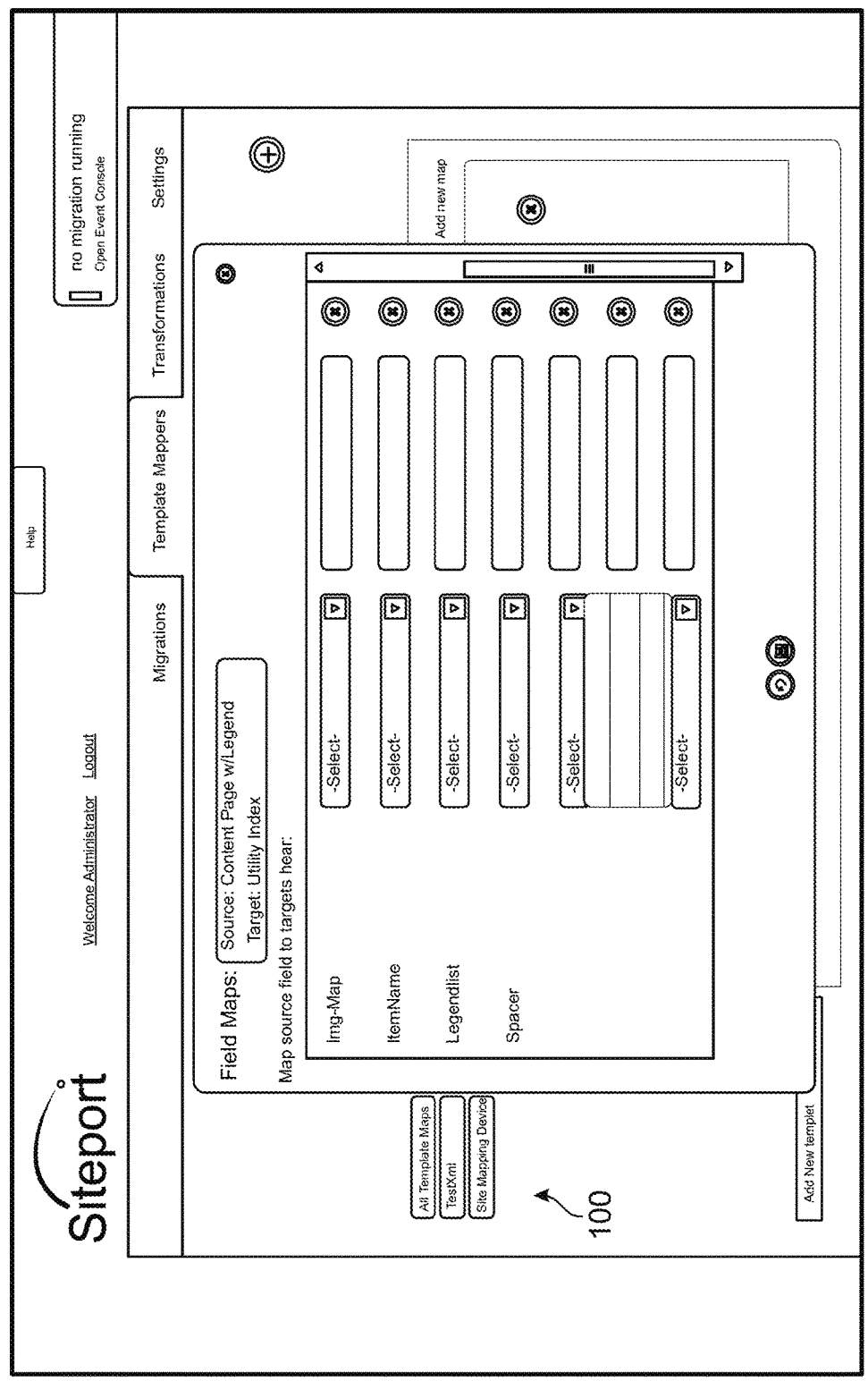
FIG. 15 is an exemplary dashboard interface for the system of FIG. 1, depicting an interface for configuring fields within the template mapping architecture.

The user then utilizes the template mapper 98 to map the old template in the origin WCM system 100 to the new template in the target WCM 102 (FIG. 14). Using this feature, the user can identify how the content should be mapped within the template (FIG. 15). The user creates a new template mapper by selecting a name, the content to include, the types of content to include (e.g. pages, page links, etc.), and the target location. Source and target WCM providers are selectable from drop box lists. The template mapper can then map the source template to the target template. In an exemplary embodiment, the source WCM is in Open Text format and the destination WCM is on SitePort. Features such as headers are declared using different code. The template mapper adapts the code to the new WCM template, enabling a seamless transition. The user can now run the migration to implement the changes by selecting a template mapper and clicking "Run."

Figure 16:
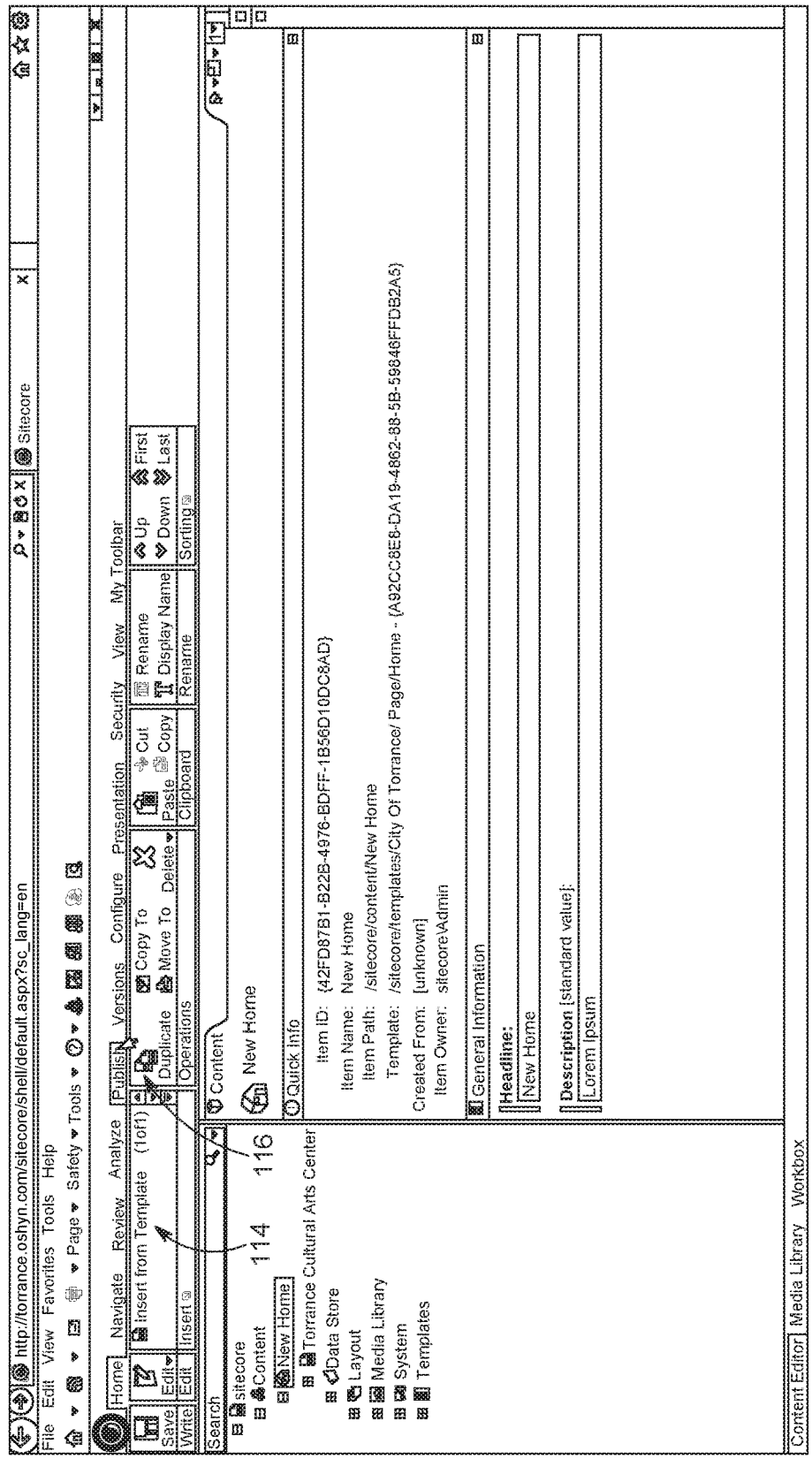
FIG. 16 is an exemplary dashboard interface for the system of FIG. 1, depicting an interface for reviewing migrated content within the target WCM system.

Using the event console, the user can check the target WCM to see that the content was migrated correctly (FIG. 16). The user can use the Editor tab 114 to edit content on the page directly and add links to the newly migrated page. Finally, content is published to the new site 116 and the user may check the results. Overall, the system's template mapping feature allows the user to move a site from one WCM to another quickly and easily.

It should be appreciated from the foregoing that the present invention provides a computer-based system and method for efficiently migrating any or all data associated with a website from a first WCM platform to a second WCM platform. The data migrated can include templates, user and group data files, content files (media, texts and others), workflows, authorizations, among others. The system further includes a transformation capability that enables modifications to website data elements during migration. For example, the website administration can transform one or more templates during migration. In this manner, web administrators can modify the website design and is transferred to and new WCM platform within an integrated process Embodiments of the present invention may comprise or utilize special purpose or general-purpose computers including computer hardware, such as, for example, one or more processors, servers, communication modules, and system memory, and the like. Embodiments within the scope of the present invention also include physical and other computer-readable media for carrying or storing computer-executable instructions and/or data structures.

Embodiments of the present invention can exist in networked environment. The "network," unless otherwise indicated, is defined as one or more data links that enable the transport of electronic data between computer systems, modules or other electronic devices, via communications connection (e.g., hard-wired, wireless, or a combination of hardwired or wireless).

Computer-executable instructions comprise, for example, instructions and data, which cause a general-purpose computer, special purpose computer, or special purpose-processing device to perform a certain function or group of functions. The computer executable instructions may be, for example, binaries, intermediate format instructions such as assembly language, or even source code. Although the subject matter has been described in language specific to structural features and/or methodological acts, it is to be understood that the present invention is not necessarily limited to the described features or acts.

Moreover, those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention provides a computer-based system and related method for migrating data associated with a website from a first Web content management (WCM) platform to a second WCM platform. The data migrated can include templates, user and group data files, content files (media, texts and others), workflows, authorizations, among others. The system and related method can further include a transformation capability that enables modifications to website data elements during migration, including but not limited to templates, HTML, users, metadata, file assets, and content such as images, links, and text during migration. In this manner, web administrators can modify the website design during migration to a new WCM platform within an integrated process.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A computer-implemented system including a hardware processor and a memory for migrating data for web content management (WCM) systems from a first WCM platform to a second WCM platform, comprising:
    a first connector module in digital communication with a first WCM platform to retrieve data from the first WCM platform, the first connector module translates the retrieved data from a format for the first WCM platform to a standardized format for the system, resulting in pre-migrated standardized data;
    a migration engine in digital communication with the first connector module, in which the migration engine receives the pre-migrated standardized data from the first connector module and transforms said pre-migrated standardized data to post-migrated standardized data, in which said post-migrated standardized data include migrated templates from a first WCM platform to a second WCM platform;
    a template mapper in digital communication with the first connector module and the migration engine, in which the template mapper identifies a plurality of origin templates of the first WCM platform and creates a mapped relationship between the plurality of origin templates and a plurality of target templates of the second WCM platform, and said mapped relationship is communicated to the migration engine to facilitate migration of the origin templates to the target templates, resulting in said post-migrated standardized data; and
    a second connector module in digital communication with the migration engine and with the second WCM platform, wherein the second connector module translates the post-migrated standardized data to a format for the second WCM platform.

2. The system as defined in claim 1, wherein the retrieved data includes webpage templates, website linkages among webpages, website scripts, digital media files, and user and group data.

3. The system as defined in claim 1, wherein the first connector module comprises executable code that translates the retrieved data to the pre-migrated standardized data.

4. The system as defined in claim 1, further comprising a transformer that enables modifications to website data elements during migration, including but not limited to templates, HTML, users, metadata, file assets, and content such as images, links, and text.

5. The system as defined in claim 1, wherein the migration engine generates post-migrated standardized data that includes target templates, webpages, and media file, that are operably linked.

6. The system as defined in claim 1, wherein the template mapper populates a selectable list presented on a user display screen, the list comprises all templates of the first WCM platform.

7. A computer-implemented method for migrating data for web content management (WCM) systems from a first WCM platform to a second WCM platform, comprising:

retrieving data from a first WCM platform via a first connector module in digital communication with the first WCM platform;

translating the retrieved data from a format for the first WCM platform to a standardized format for a migration engine that is in digital communication with the first connector module, resulting in pre-migrated standardized data, via the first connector module;

mapping relationships between origin templates of the first WCM platform and target templates for the second WCM platform, via a template mapper that is in digital communication with the migration engine, and said mapped relationships between the origin templates and the target templates are communicated to the migration engine;

transforming the pre-migrated standardized data received from the first connector module using the mapped relationships received from the template mapper to a post-migrated standardized data, via the migration engine;

retrieving the post-migrated standardized data via a second connector module in digital communication with the migration engine;

translating the post-migrated standardized data to resultant data in a format for the second WCM platform, via the second connector module; and transmitting the resultant data to the second WCM platform.

8. The method as defined in claim 7, wherein the retrieved data includes webpage templates, website linkages among webpages, website scripts, digital media files, and user and group data.

9. The method as defined in claim 7, wherein the first connector module comprises executable code that translates the retrieved data to the pre-migrated standardized data.

10. The method as defined in claim 7, further comprising a transformer that enables modifications to website data elements during migration, including but not limited to templates, HTML, users, metadata, file assets, and content such as images, links, and text.

11. The method as defined in claim 7, wherein the migration engine generates post-migrated standardized data that includes target templates, webpages, and media file, that are operably linked.

12. The method as defined in claim 7, wherein the template mapper populates a selectable list presented on a user display screen, the list comprises all templates of the first WCM platform.

* * * * *